US007134191B2

(12) United States Patent
Shioda

(10) Patent No.: US 7,134,191 B2
(45) Date of Patent: Nov. 14, 2006

(54) TERMINAL PRESS-FITTING DEVICE

(75) Inventor: Ryousuke Shioda, Mic (JP)

(73) Assignees: Autonetworks Technologies, Ltd., Mie (JP); Sumitomo Wiring Systems, Ltd., Mie (JP); Sumitomo Electric Industries, Osaka (JP)

( * ) Notice: Subject to any disclaimer, the term of this patent is extended or adjusted under 35 U.S.C. 154(b) by 81 days.

(21) Appl. No.: 10/792,851

(22) Filed: Mar. 5, 2004

(65) Prior Publication Data

US 2004/0175970 A1 Sep. 9, 2004

(30) Foreign Application Priority Data

Mar. 6, 2003 (JP) ............................ 2003-060457

(51) Int. Cl.
*B23P 19/00* (2006.01)

(52) U.S. Cl. ........................... 29/760; 29/739; 29/741; 29/747; 29/845; 29/33 M; 439/80; 439/374; 439/733.1

(58) Field of Classification Search .................. 29/739, 29/753, 740, 741, 747, 760, 761, 845, 33 M; 439/79–83, 374, 381, 733, 751
See application file for complete search history.

(56) References Cited

U.S. PATENT DOCUMENTS 3,545,606 A * 12/1970 Lightner et al. ............ 206/716
5,453,016 A * 9/1995 Clark et al. .................... 439/79
5,600,881 A * 2/1997 Wanha ......................... 29/741

FOREIGN PATENT DOCUMENTS

| | | |
|---|---|---|
| DE | 692 00 366 T2 | 2/1995 |
| DE | 196 07 548 A1 | 10/1997 |
| DE | 196 18 497 A1 | 11/1997 |
| JP | A 7-65929 | 3/1995 |

* cited by examiner

*Primary Examiner*—Richard Chang
(74) *Attorney, Agent, or Firm*—Oliff & Berridge, PLC

(57) ABSTRACT

A press-fitting device in which a terminal of a connector having a staggered arrangement section of the terminal of the connector is press-fitted into an insertion hole is provided. In the press-fitting device, a first terminal restricting member on which a guide section for restricting a vertical displacement of the terminals between the terminals along the lateral direction of the connector housing and a second terminal restricting member on which a guide section for restricting the lateral displacement of the terminals between the terminals along the vertical direction of the connector housing in an upper or lower part of the first terminal restricting member are provided. A guide groove to which terminals on an interior side of the connector housing are introduced is provided at a tip end portion of the guide portion positioned at the staggered arrangement section of the terminals.

2 Claims, 17 Drawing Sheets

TERMINAL PRESS-FITTING DEVICE

BACKGROUND OF THE INVENTION

1. Field of the Invention

The present invention relates to a terminal press-fitting device for which a tip end section of a terminal provided in a projected manner in a connector housing is press-fitted into an insertion hole formed on a substrate to connect the terminal and the substrate.

2. Description of the Related Art

A conventional structure is described in JP-A-7-65929, for example. In JP-A-7-65929, a for-substrate connector in which pin-like terminals (for-substrate connection pieces) are provided in a matrix form and are provided in a projected manner is mounted on a substrate such that the first comb teeth-like terminal arrangement plate in which guide grooves for guiding the pin-like terminals arranged in columns are formed at the same interval as the column space pitch and the number of columns is attached at a position in the vicinity of a face of the connector abutting against the substrate. Thereafter, the second comb teeth-like terminal arrangement plate in which guide grooves for guiding the terminals arranged in rows are formed at the same interval with the row space pitch and the number of rows is attached in the vicinity of the surface of the above-mentioned first comb teeth-like terminal arrangement plate. Then, the tip end of the above-mentioned terminal projecting out of the surface of the second comb teeth-like terminal arrangement plate and the insertion hole (through hole) of the substrate are used to temporarily mount the connector on the substrate to remove the first and the second comb teeth-like terminal arrangement plates. Thereafter, the above-mentioned connector is pressed toward the substrate side so that this connector is mounted on the substrate.

As described above, the above-mentioned structure is provided such that the above-mentioned tip end section of the terminal is press-fitted into the insertion hole formed in the substrate while the pin-like terminals provided in a projected manner in the connector housing are restricted by the above-mentioned first and the second comb teeth-like terminal arrangement plates. This structure has an advantage in that the above-mentioned connector can be mounted on the substrate without requiring special man-hours for modification even when these terminals have a thin shape and thus tend to be bent or to slant. However, this structure has a problem in that arrangements other than the matrix-like arrangement in which a plurality of terminals are provided on intersection points at which a plurality of lines extending column-wise of the connector and a plurality of lines extending row-wise intersect with one another prevent the comb teeth of the first and the second comb teeth-like terminal arrangement plates from providing the function for sufficiently positioning the terminals, thus failing to provide an effective prevention in the deformation of the terminals.

Specifically, this structure has a problem as shown below. When the terminals of the connector are arranged in a staggered manner due to a layout reason any of the comb teeth of the first comb teeth-like terminal arrangement plate and the comb teeth of the second comb teeth-like terminal arrangement plate cannot be straightly introduced to the area in which the above-mentioned terminals are provided As a result, when the above-mentioned tip end section of the terminal is press-fitted into the insertion hole of the substrate, the terminal cannot be positioned precisely, making it difficult to press-fit the tip end section of the terminal into the insertion hole of the substrate properly. In the case of a so-called press fit connector, in particular, by which the terminals and the substrate can be connected only by press-fitting the terminal into the insertion hole of the substrate without requiring soldering, when press-fitting the terminal into the above-mentioned insertion hole, an extremely large press-fitting force is required. Thus, an insufficiently-positioned terminal causes deformation of the terminal such as bending and slanting.

SUMMARY OF THE INVENTION

It is an object of the present invention to provide a terminal press-fitting device by which, even when at least some of the terminals provided in a projected manner in a connector housing are arranged in a staggered manner, the terminals can be press-fitted into the insertion holes of the substrate in an appropriate manner while each of the terminals is being appropriately restricted.

In order to solve the above-mentioned problem, the present invention provides a terminal press-fitting device in which a plurality of terminals are provided in a connector housing in a projected manner, and terminals of a connector having a staggered,arrangement section of the terminals for which an arrangement position of the terminals in a lateral direction of the connector housing is set in a staggered manner are press-fitted into an insertion hole formed on the substrate, comprising: a first terminal restricting member on which a guide section for restricting the vertical displacement thereof by being introduced between the terminals along the lateral direction of the connector housing is provided; and a second terminal restricting member on which a guide section for restricting the lateral displacement thereof by being introduced between the terminals along the vertical direction of the connector housing in an upper or lower part of the first terminal restricting member is provided; wherein guide grooves to which terminals arranged on the interior side of the connector housing are introduced is provided at a tip end portion of the guide portion of the first terminal restricting member positioned at the staggered arrangement section of the terminals.

According to the above-mentioned structure, in accordance with an operation for introducing the guide section of the first terminal restricting member between the terminals arranged at the exterior side of the above-mentioned staggered arrangement section, the terminals arranged at the interior side are introduced into the above-mentioned guide grooves, thereby restricting the vertical displacement of each terminal by the base end section and the tip end section of the above-mentioned guide section, respectively. The guide section of the above-mentioned second terminal restricting member in this state is introduced along the vertical direction of the connector housing to a part in which the terminal is provided, thereby restricting the horizontal displacement of each terminal by the guide sections of the above-mentioned first and second terminal restricting members.

It is preferable to have a structure in that the lower end face of an expanded section provided at each terminal is provided to be opposed to the upper end face of the guide section composing the first terminal restricting member, and when the terminal is press-fitted, the lower face of the expanded section is made to abut against the upper end face of the guide section so as to restrict the displacement of each terminal in the lower direction.

According to the above-mentioned structure, when the tip end section of the terminal is press-fitted into the insertion hole of the substrate, the lower face of the above-mentioned expanded section abuts against the upper end face of the above-mentioned guide section to restrict the displacement of each terminal in the lower direction, thereby effectively preventing buckling deformation of the terminal.

DETAILED DESCRIPTION OF THE PREFERRED EMBODIMENTS

Figure 1A:
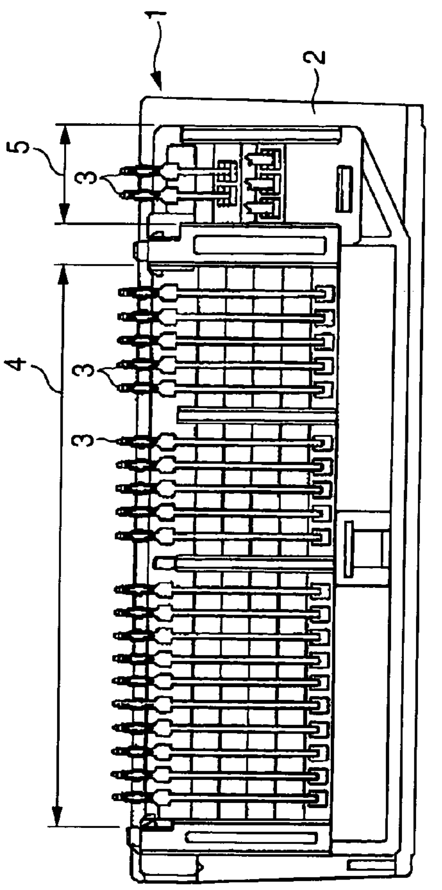
FIGS. 1A to 1C show a specific structure of a connector in which terminals are provided in a projected manner.
Figure 1C:
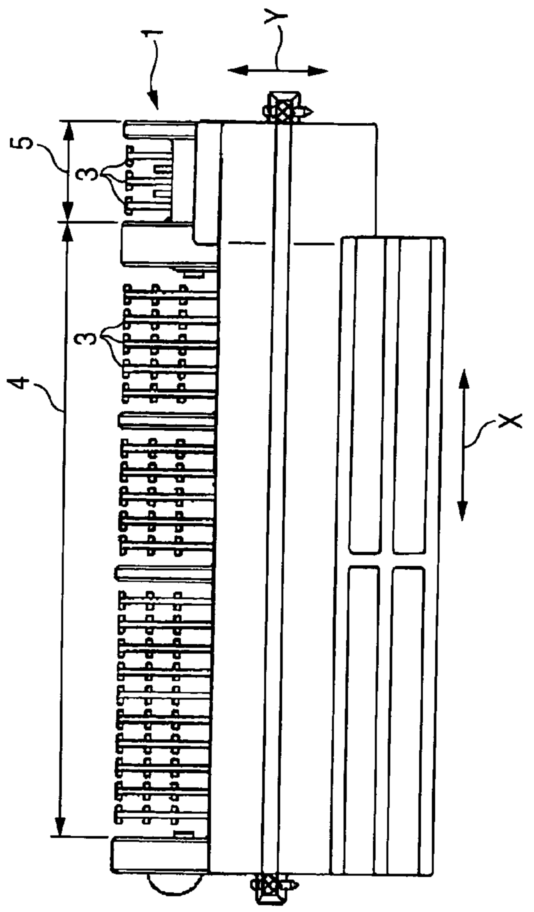
Figure 1B:
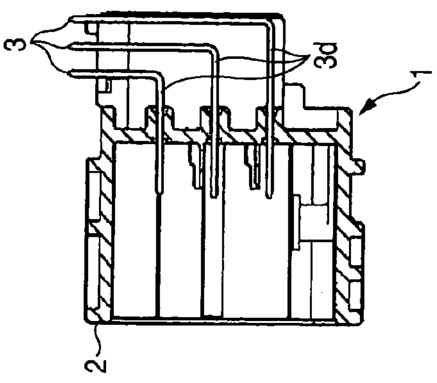

FIG. 1 shows the entire structure of the connector 1 having terminals that are press-fitted into the substrate by the terminal press-fitting device according to the present invention FIG. 1A is a front view of the connector 1. FIG. 1B is a cross-sectional view of the left side face of the connector 1. FIG. 1C shows the bottom face of the connector 1. This connector 1 includes: the synthetic resin-made connector housing 2 the entirety of which has a substantially cuboid shape; and a plurality of pin-like terminals 3 that are provided in a projected manner in this connector housing 2.

Figure 2A:
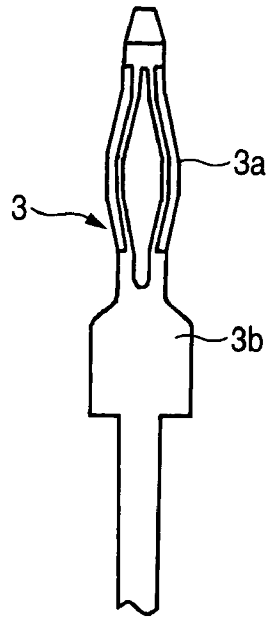
FIGS. 2A and 2B show a specific structure of the terminal.
Figure 2B:
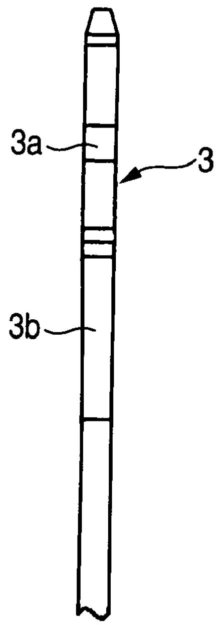

In this embodiment, the terminal 3 is formed to have an “L”-like shape by the base end section 3*d* that is horizontally provided in a projected manner from the connector housing 2; and the erecting section that is provided in a projected manner in the upward direction from the tip end section of this base end section 3*d.* The tip end section of the above-mentioned terminal 3 (the upper end section of the erecting section) is provided to be projected in the upward direction of the connector housing 2. As shown in FIGS. 2A and 2B, the tip end section of the above-mentioned terminal 3 has the elastic deformable press-fitting section 3*a* that is press-fitted into the insertion hole formed in the substrate described later; and the expanded section 3*b* that is provided in the lower direction of this press-fitting section 3*a* and that is projected in left and right directions of the terminal 3.

Figure 3:
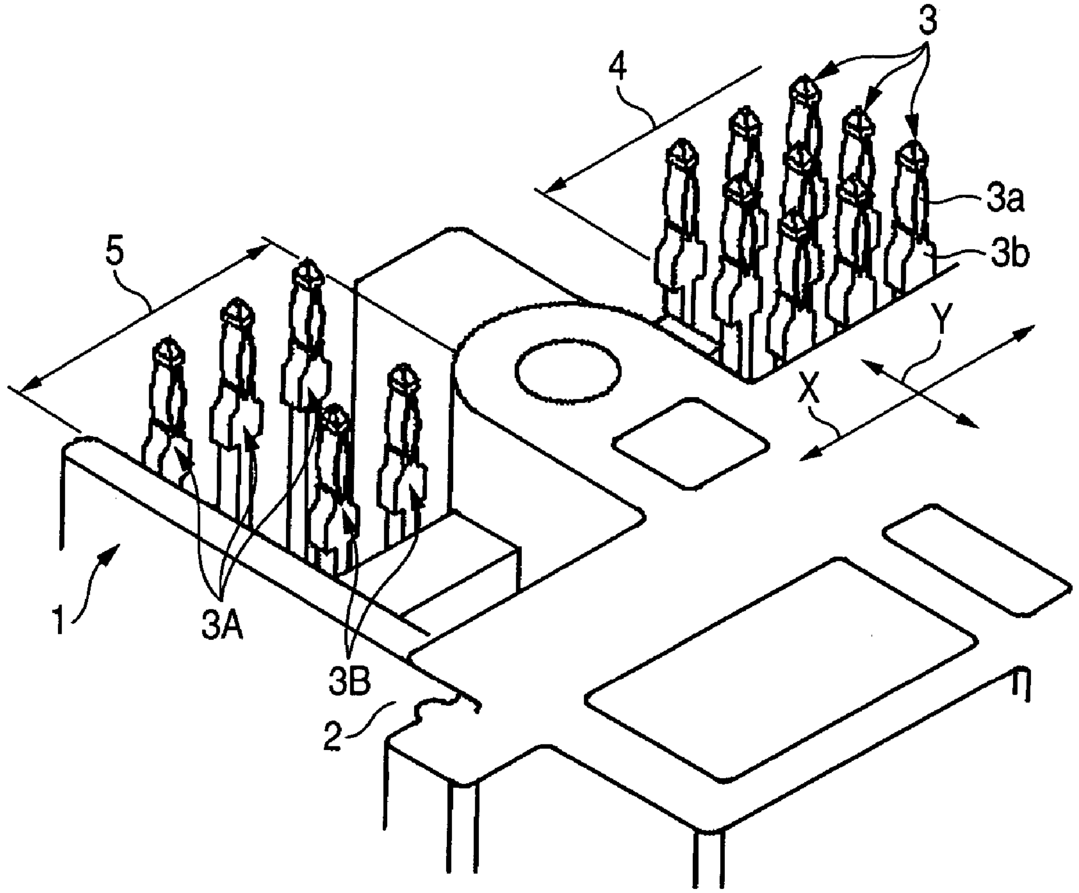
FIG. 3 is a perspective view showing the arrangement of the terminals.

As shown in FIG. 1 and FIG. 3, in most regions of the above-mentioned connector housing 2, each terminal 3 is provided on the intersection point of a terminal provision line extending in the vertical direction (longitudinal direction) X of the connector housing 2 and a terminal provision line extending in the lateral direction Y orthogonal to the above-mentioned vertical direction X. This provides the matrix-like arrangement section 4 of the terminals 3 in which a plurality of terminals 3 are arranged in parallel at a fixed interval.

In the remainder of, the region of the above-mentioned connector housing 2, there is provided the staggered arrangement section 5 of the terminals 3A and 3B in which the three terminals 3A are provided at the front face side (exterior side) and the two terminals 3B are provided at the rear side (interior side). That is, the two terminals 3B arranged at the interior side of the connector housing 2 are provided at positions that are offset in the vertical direction X of the connector housing 2 by a distance corresponding to half of the arrangement pitch of the above-mentioned terminals 3A, thus allowing the above-mentioned terminals 3A and 3B to be arranged in the lateral direction Y of the connector housing 2 in a staggered manner.

Figure 4:
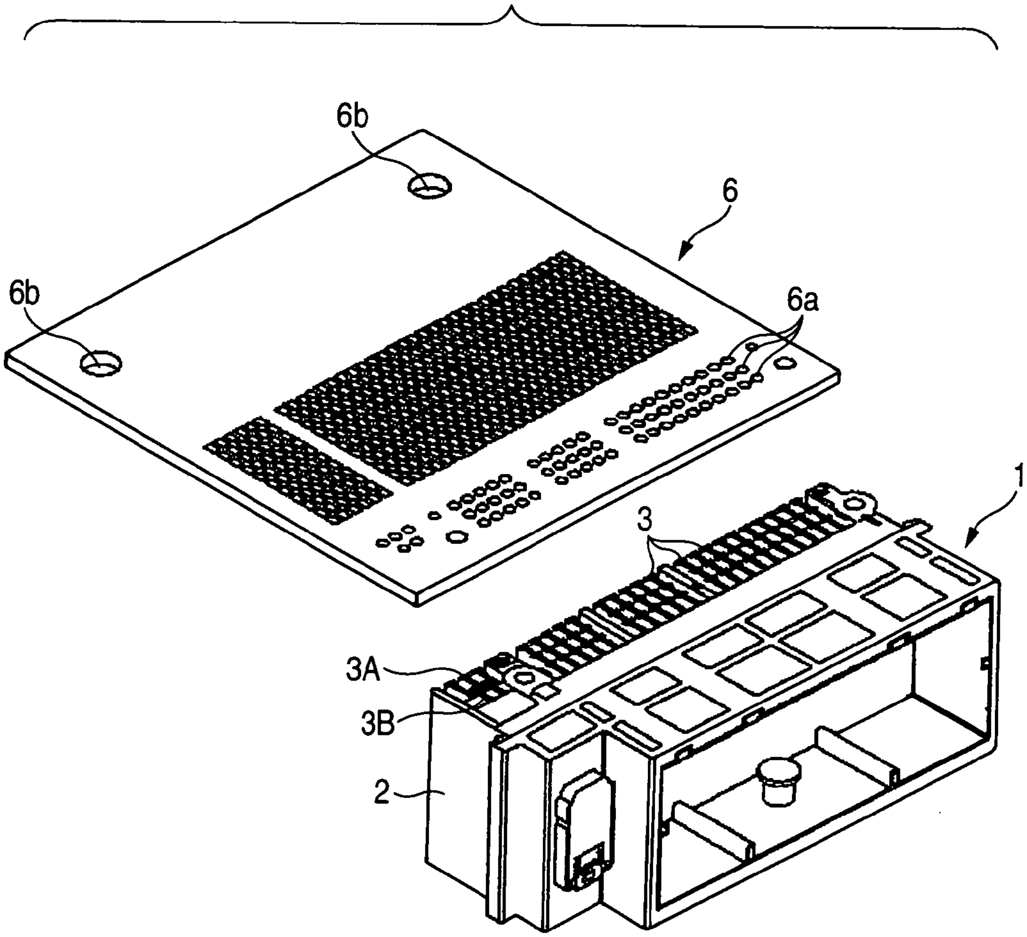
FIG. 4 is a perspective view showing the entire structure of the terminals and the substrate.

FIG. 4 shows the outline of the structure of the substrate 6 consisting of a printed-circuit board or the like that is connected to the above-mentioned connector housing 2. At one end section side of this substrate 6, there are formed a plurality of insertion holes 6*a* to which the tip end sections of the terminals 3 provided in a projected manner in the upward direction of the connector housing 2 are press-fitted so as to correspond to the positions at which the above-mentioned terminals 3 are arranged, respectively. At another end section side of the above-mentioned substrate 6, a pair of left and right positioning holes 6*b* are formed.

Figure 5:
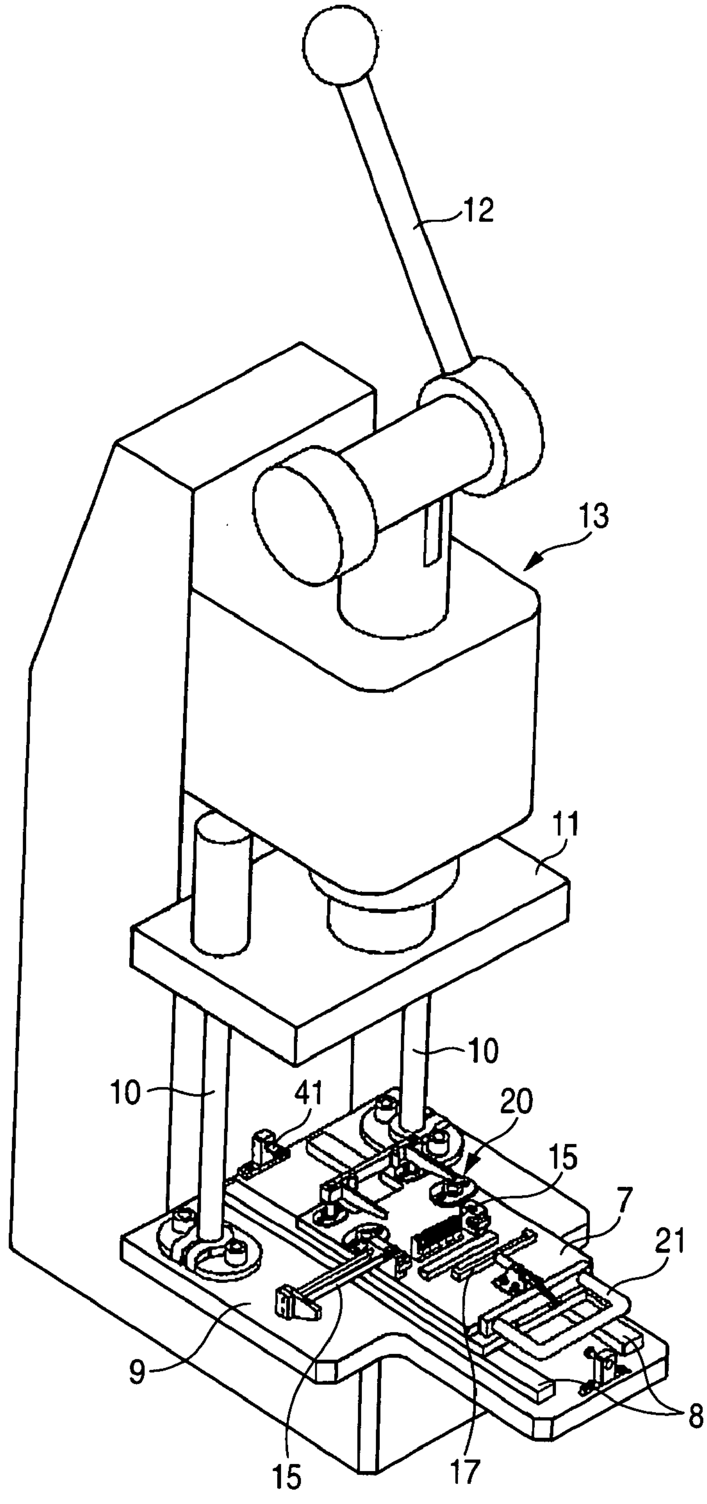
FIG. 5 is a perspective view showing the entire structure of the terminal press-fitting device according to the present invention.
Figure 6:
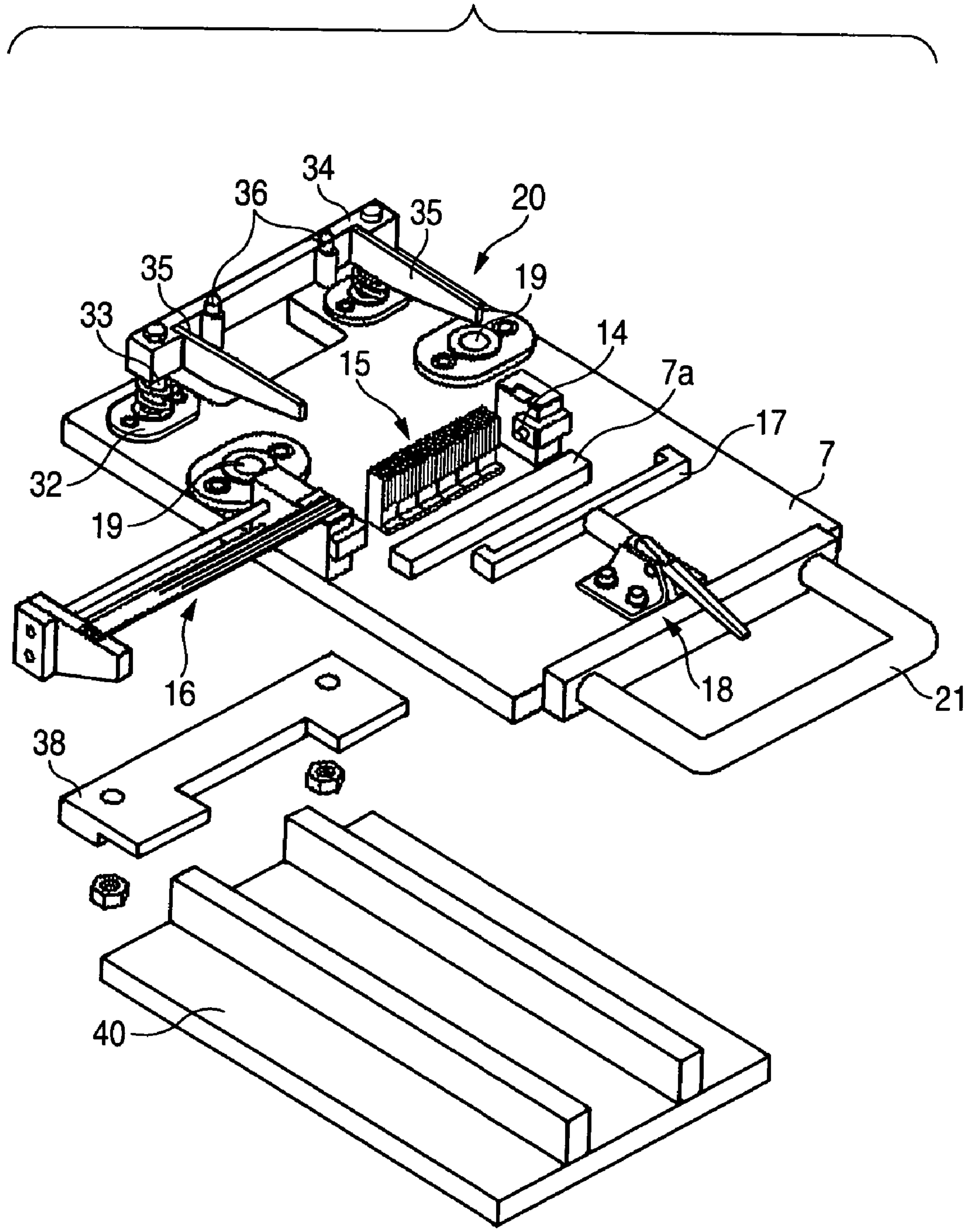
FIG. 6 is a perspective view showing the main part of the terminal press-fitting device according to the present invention.

FIG. 5 and FIG. 6 illustrate embodiments of the terminal press-fitting device according to the present invention. This terminal press-fitting device includes: the support table 7 for supporting the above-mentioned connector housing 2 and the substrate 6 while they are positioned; the base plate 9 for allowing the above-mentioned support table 7 to be slidably supported in the front and rear directions along the pair of left and right guide rails 8 provided at the upper face; the pair of left and right elevation bars 10 provided at the depth side of this base plate 9; the pressing plate 11 that is supported to be elevated along this elevation bar 10; and the elevation driving mechanism 13 including the operation handle 12 for pushing down this pressing plate 11 by a manual operation. It is also possible that the above-mentioned elevation driving mechanism 13 has an electric driving section, an air pressure driving section, or a hydraulic driving section to automatically move the above-mentioned pressing plate 11 up and down in accordance with the switch operation.

The above-mentioned support table 7 has: the placement plate 7*a* on which the connector housing 2 is placed; the positioning stopper 14 to which the side end face of the connector housing 2 placed on this placement plate 7*a* is pushed so that the connector housing 2 is positioned in the lateral direction Y; the first terminal restricting member 15 provided at the depth side of the above-mentioned placement plate 7*a;* the second terminal restricting member 16 that is slidably provided in left and right directions at one side of the support table 7; the clamp member 17 making pressure contact with the rear face section of the above-mentioned connector housing 2; and the connector-holding mechanism 18 for pushing this clamp member 17 toward the depth side of the support table 7 to hold the connector housing 2.

The support table 7 also has formed a pair of left and right positioning holes 19. When the terminal 3 described later is press-fitted, a positioning pin (not shown) provided in the elevation driving mechanism 13 is inserted into the above-mentioned positioning hole 19, thus positioning the above-mentioned pressing plate 11 and the support table 7. At the depth side of the above-mentioned support table 7, there is also provided the substrate-holding section 20 for holding the positioned substrate 6. At the front end of the support table 7, the grip 21 for sliding operations is attached.

Figure 7:
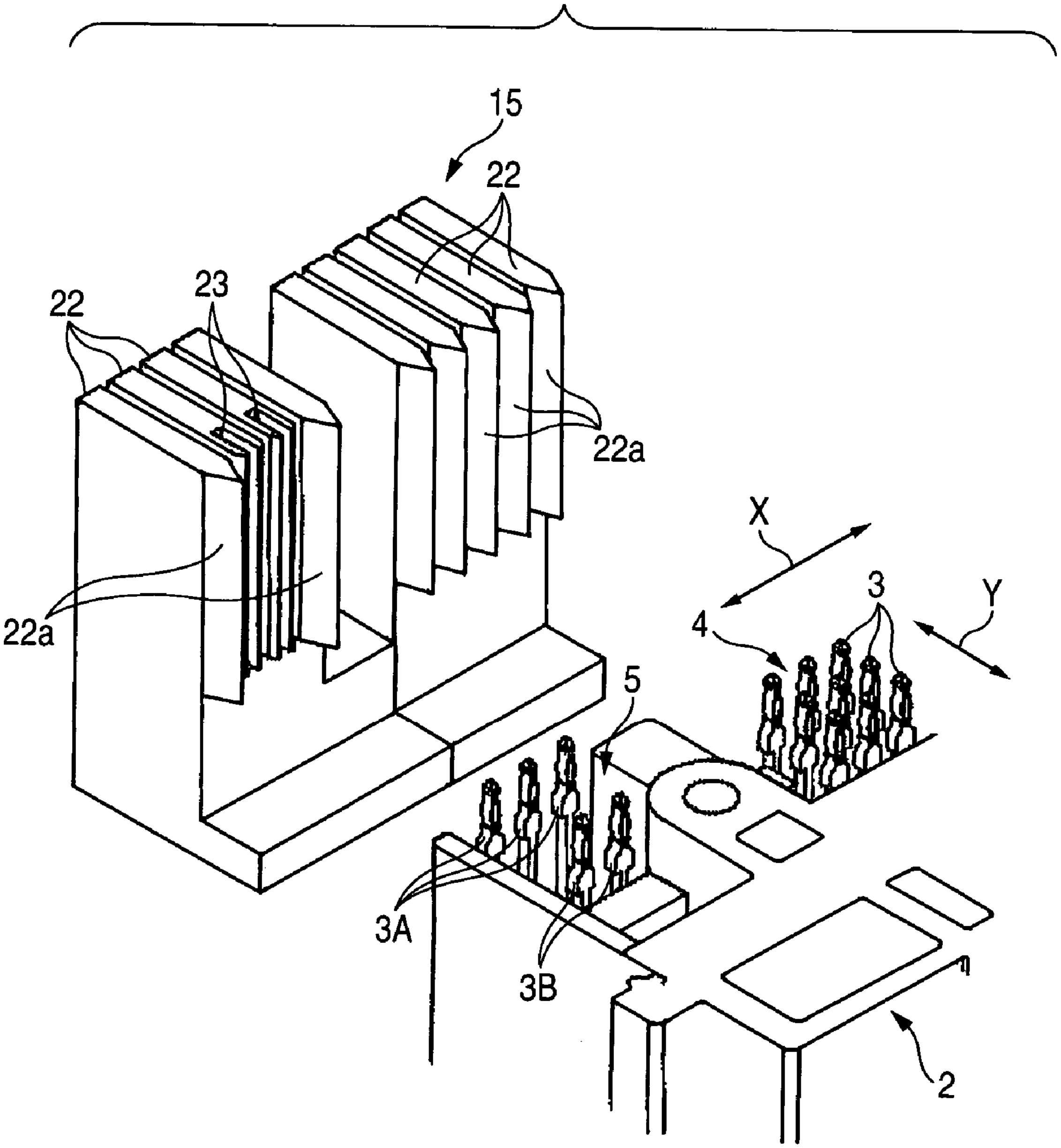
FIG. 7 is a perspective view illustrating a specific structure of the first terminal restricting member.
Figure 8:
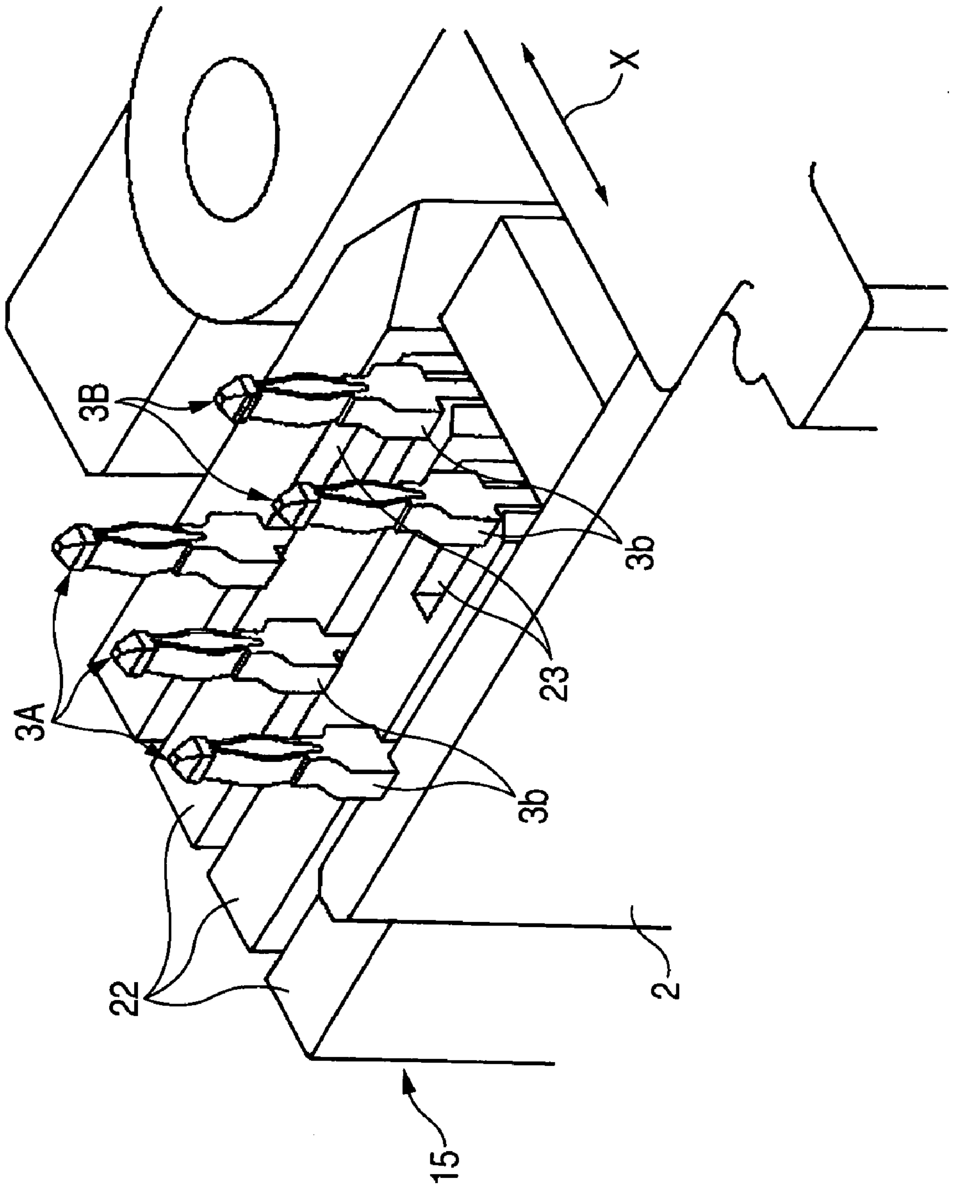
FIG. 8 illustrates the first terminal restricting member introduced to a part in which the terminals are provided.

As shown in FIG. 7 and FIG. 8, the above-mentioned first terminal restricting member 15 has a plurality of guide sections 22 that are arranged in the vertical direction X of the connector housing 2 at a fixed interval and that are provided in a projected manner in the lateral direction Y of the connector housing 2. Each guide section 22 consists of a plate member having a thickness that can be introduced into the terminals 3 adjacent to one another that are arranged in the above-mentioned vertical direction X and is provided at a position at which the upper end face is opposed to the lower end face of the expanded section 3*b* provided in each terminal 3.

The guide section 22 of the above-mentioned first terminal restricting member 15 is structured to, in accordance with an operation for holding the connector housing 2 described later, be introduced along the lateral direction Y to a region in which the terminals 3 are provided. As a result, when a erecting section of each terminal 3 (lower part of the expanded section 3*b*) abuts against the above-mentioned guide section 22, the displacement of each terminal 3 in the vertical direction X is restricted and, when the tip end section of the terminal 3 is press-fitted into the insertion hole 6*a* of the substrate 6, the expanded section 3*b* of each terminal 3 abuts against the upper face of the above-mentioned guide section 22, thus restricting the displacement of each terminal 3 in the lower direction. Furthermore, the above-mentioned guide section 22 has a tapered shaped taper face 22*a* that functions as a guide face for introducing the tip end section between the terminals 3.

Among the guide sections 22 positioned in the staggered arrangement section 5 of the above-mentioned terminals 3A and 3B, the guide section 22 that is introduced between the terminals 3A arranged on the front face of the connector housing 2 has, at the front end thereof, the guide groove 23 having a predetermined width that extends in the upper and lower directions. The interior of this guide groove 23 is introduced with the erecting section of terminal 3B arranged at the rear side of the above-mentioned terminal 3A (lower part of the expanded section 3*b*).

Figure 9:
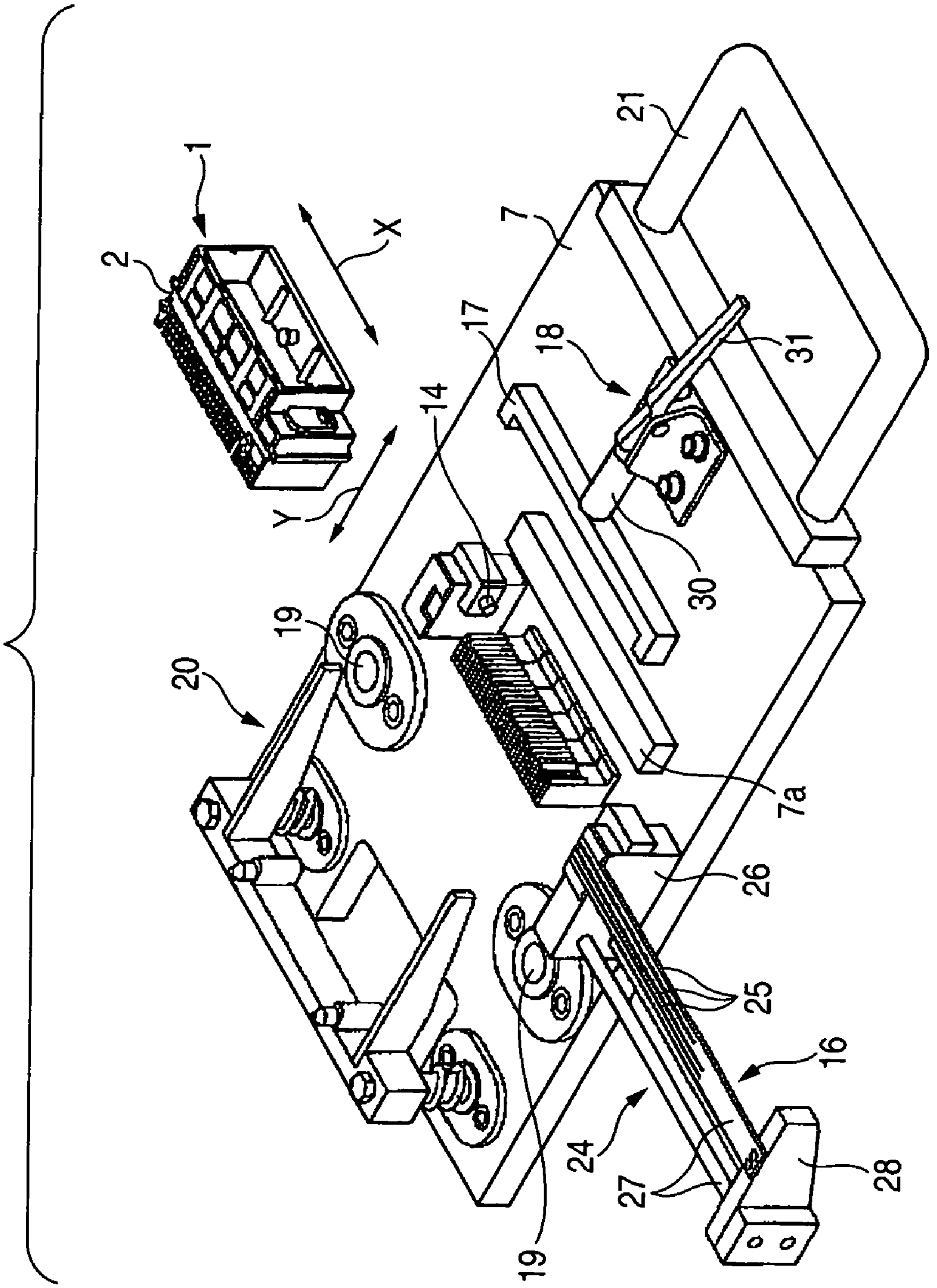
FIG. 9 is a perspective view illustrating a specific structure of the second terminal restricting member.
Figure 10:
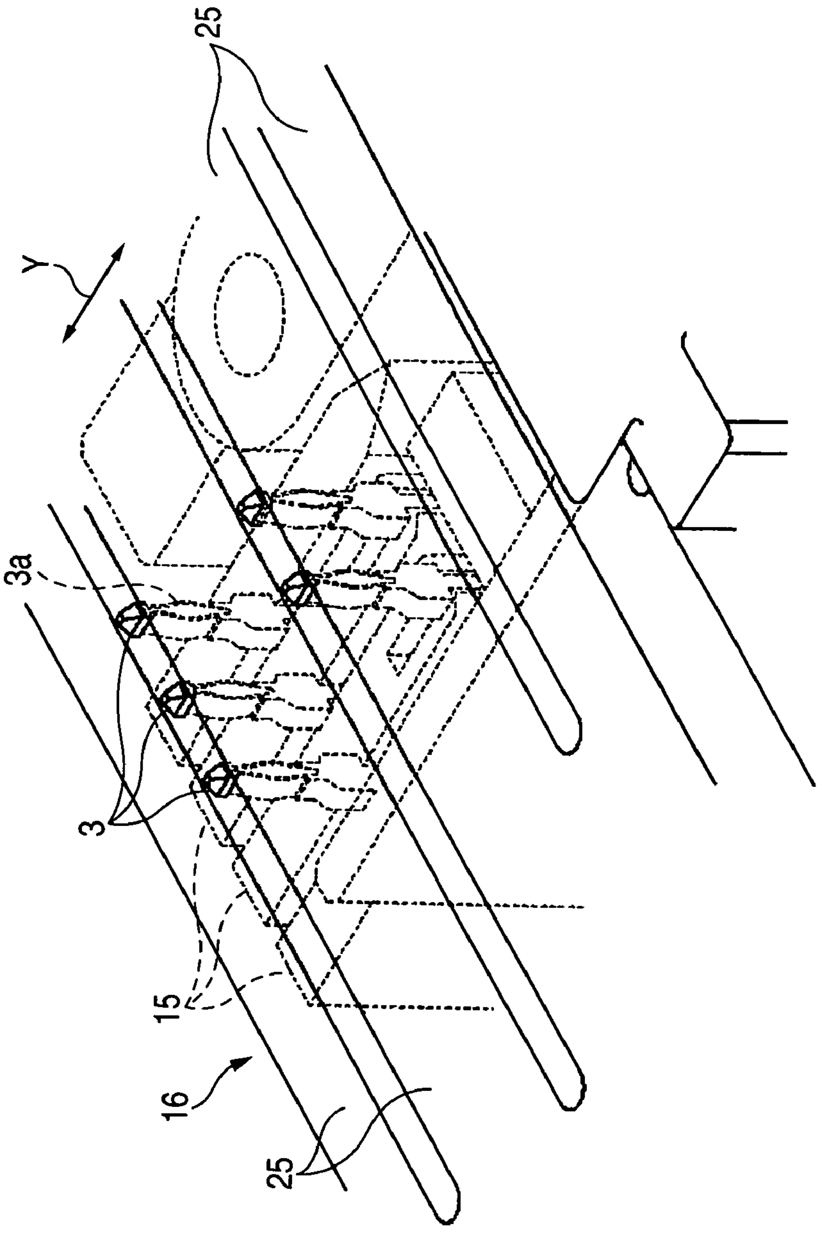
FIG. 10 illustrates the second terminal restricting member introduced to a part in which the terminal is provided.

As shown in FIG. 9 and FIG. 10, the above-mentioned second terminal restricting member 16 extends along the vertical direction X of the connector housing 2 and consists of comb teeth-like plate members that are provided in the lateral direction Y of the connector housing 2 at a fixed interval and that have a plurality of guide sections 25. The second terminal restricting member 16 is supported so as to be slidable in the vertical direction X of the above-mentioned connector housing 2 by the support mechanism 24 provided at one side of the above-mentioned support table 7. The guide section 25 of the above-mentioned second terminal restricting, member 16 is introduced along the upper face of the above-mentioned first terminal restricting member 15 and the vertical direction X of the connector housing 2 to the region in which the terminals 3 are provided. As a result, the guide section 25 abuts against a part in the vicinity of the tip end section of each terminal 3, that is, a part corresponding to the press-fitting section 3*a* of each terminal 3, to restrict the displacement of each terminal 3 in the lateral direction Y.

The support mechanism 24 of the above-mentioned second terminal restricting member 16 has: the support bracket 26 provided at one side of the support table 7; a pair of upper and lower guide bars 27 that are provided in a projected manner and that are horizontally provided toward the exterior side from this support bracket 26; and the slide block 28 that is slidably supported along this guide bar 27. The upper face of this slide block 28 is attached with the base end section of the above-mentioned second terminal restricting member 16. When the above-mentioned slide block 28 is slid to have a horizontal displacement along the guide bar 27, the above-mentioned second terminal restricting member 16 is moved from a stand-by position as shown in FIG. 9 in which the second terminal restricting member 16 evacuates to the exterior side of the support table 7 to a restrictive position as shown in FIG. 10 in which the above-mentioned guide section 25 restricts the lateral displacement of the terminal 3 (see FIG. 13).

Figure 11:
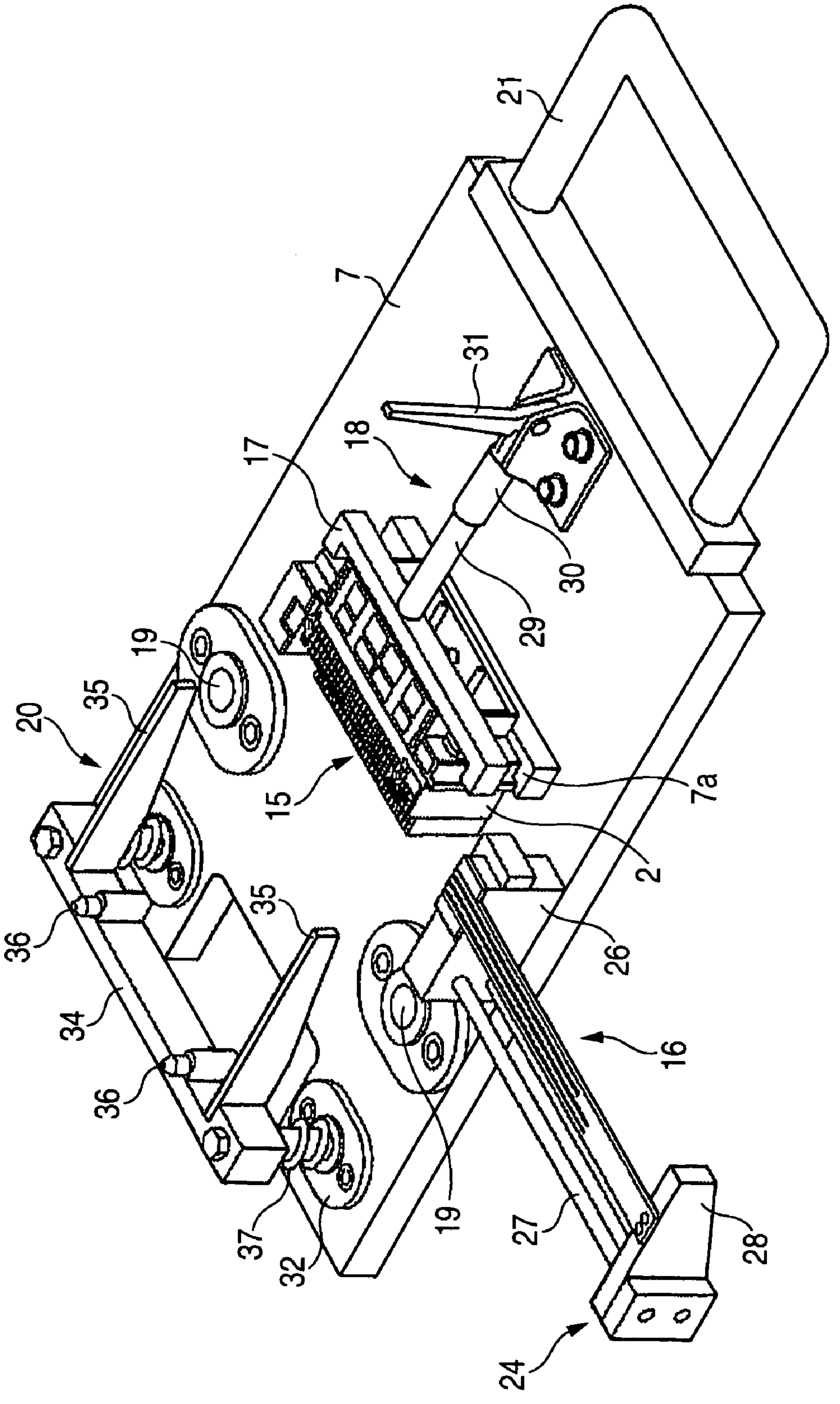
FIG. 11 is a perspective view illustrating the connector held on the support table.

As shown in FIG. 11, the above-mentioned connector-holding mechanism 18 has the driving shaft 29 that is, provided in a projected manner at the clamp member 17; the support cylinder 30 for supporting this driving shaft 29 in a slidable manner; and the operation lever 31 for allowing the above-mentioned driving shaft 29 to move into or to move out of the support cylinder 30 so that the clamp member 17 is moved in the front and rear directions. By making the above-mentioned operation lever 31 operate to push the driving shaft 29 toward the front side while the connector housing 2 is being provided on the above-mentioned placement plate 7*a* and its side end section is made to abut against the positioning stopper 14 to be positioned in the left and right directions, the rear face of the above-mentioned connector housing 2 is engaged with the clamp member 17 in a press contact manner.

By making the connector housing 2 be pushed via the above-mentioned clamp member 17 toward the depth side of the support table 7, each guide section 22 of the first terminal restricting member 15 is introduced along the lateral direction Y of the connector housing 2 to the region in which the terminals 3 are provided as shown in FIG. 8 and the above-mentioned connector housing 2 is held to be positioned on the substantial center part of the support table 7 as shown in FIG. 11.

As shown in FIG. 11 and FIG. 12, the above-mentioned substrate-holding section 20 has; a pair of left and right supporting columns 33 that are supported in an elevatable manner by the slide support section 32 provided at the inner end section of the support table 7; the elevation frames 34 provided between the upper end sections of these supporting columns 33; a pair of left and right arms 35 that are provided in a projected manner in this elevation frame 34; and a pair of left and right positioning pins 36 fixed to the above-mentioned elevation frame 34. The above-mentioned substrate-holding section 20 is structured such that, when the substrate 6 is held by the above-mentioned substrate-holding section 20, this positioning pin 36 is inserted into the positioning hole 6*a* of the substrate 6 to position the substrate 6 on the support table 7 in the horizontal direction.

Figure 12A:
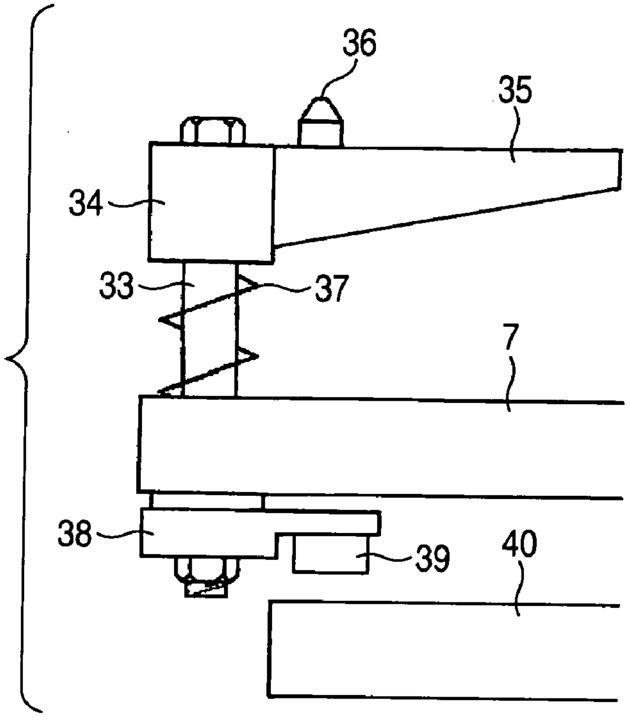
FIGS. 12A and 12B show a specific structure of the substrate-holding section.
Figure 12B:
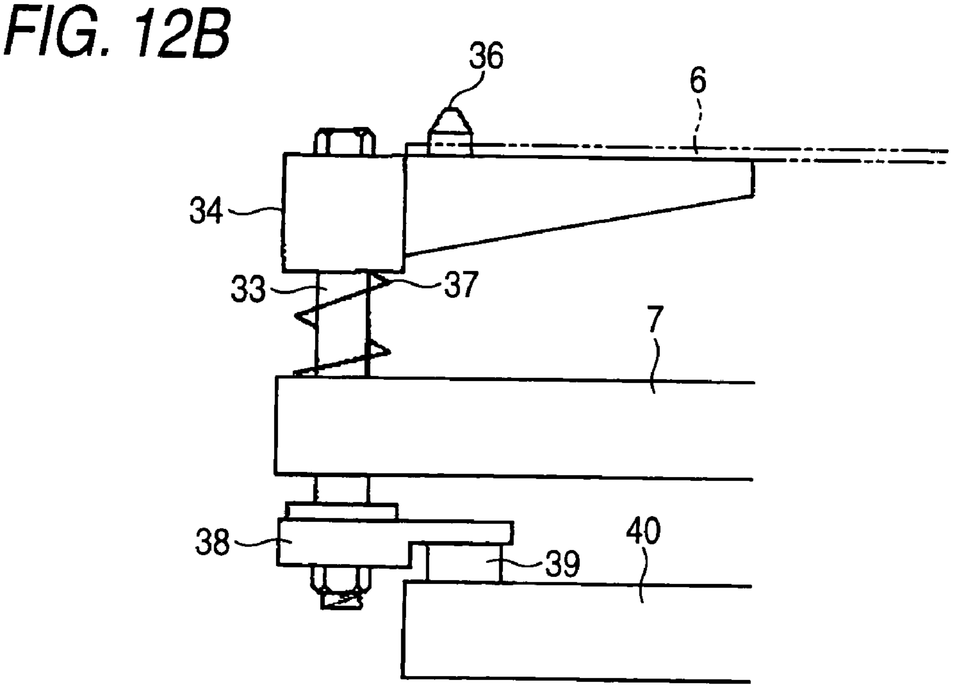

The above-mentioned supporting column 33 is externally engaged with the compression coil spring 37 for biasing the elevation frame 34 in an upward direction and, at the lower face side of the support table 7, the lock plate 38 having the magnet 39 is fixed to the lower end of the supporting column 33. In a normal setting, the above-mentioned elevation frame 34 and the positioning pin 36 are locked to the substrate set position in the upward direction as shown in FIG. 12A by the biasing force of the above-mentioned compression coil spring 37. In a press-fitting operation which will be described later, the above-mentioned supporting column 33 and the lock plate 38 are lowered in accordance with a pushing down force from the above-mentioned pressing plate 11 against the biasing force by the above-mentioned compression coil spring 37. As a result, the holding plate 40 consisting of magnetic material that is provided in the lower direction of the support table 7 attracts the above-mentioned magnet plate 39, thus holding the above-mentioned elevation frame 34 and positioning pin 36 at the lowering position shown in FIG. 12B.

In order to connect the substrate 6 to the connector 1 by using the press-fitting device structured as described above to press-fit the tip end section of the terminal 3 to the insertion hole 6*a* of the substrate 6, the connector housing 2 is first made placed on the placement plate 7*a* of the support table 7 as shown in FIG. 11, and held in a manner such that the connector housing 2 is positioned at the approximately center portion on the support table 7 by operating the connector holding mechanism 18 to press-contact the clamp member 17 to the rear face of the connector housing 2 in a state where the one end part of the connector housing 2 is made to abut against the positioning stopper 14.

In accordance with this operation for holding the connector housing 2, the matrix-like arrangement section 4 of the terminals 3 is provided such that the guide section 22 of the first terminal restricting member 15 is introduced to the rear side along the lateral direction Y of the connector housing 2 and the above-mentioned guide section 22 restricts the vertical displacement of each terminal 3. On the other hand, the staggered arrangement section 5 of the terminals 3A and 3B are provided as shown in FIG. 8 in which each guide section 22 of the first terminal restricting member 15 is introduced to the rear side along the terminal 3A positioned at the front side of the connector housing 2 and, in accordance with this, the guide groove 23 formed at the tip end section of the guide section 22 is introduced with the terminal 3B positioned at the rear side of the connector housing 2. As a result, the above-mentioned guide section 22 and guide groove 23 restrict the vertical displacement of the terminals 3A and 3B, respectively.

Figure 13:
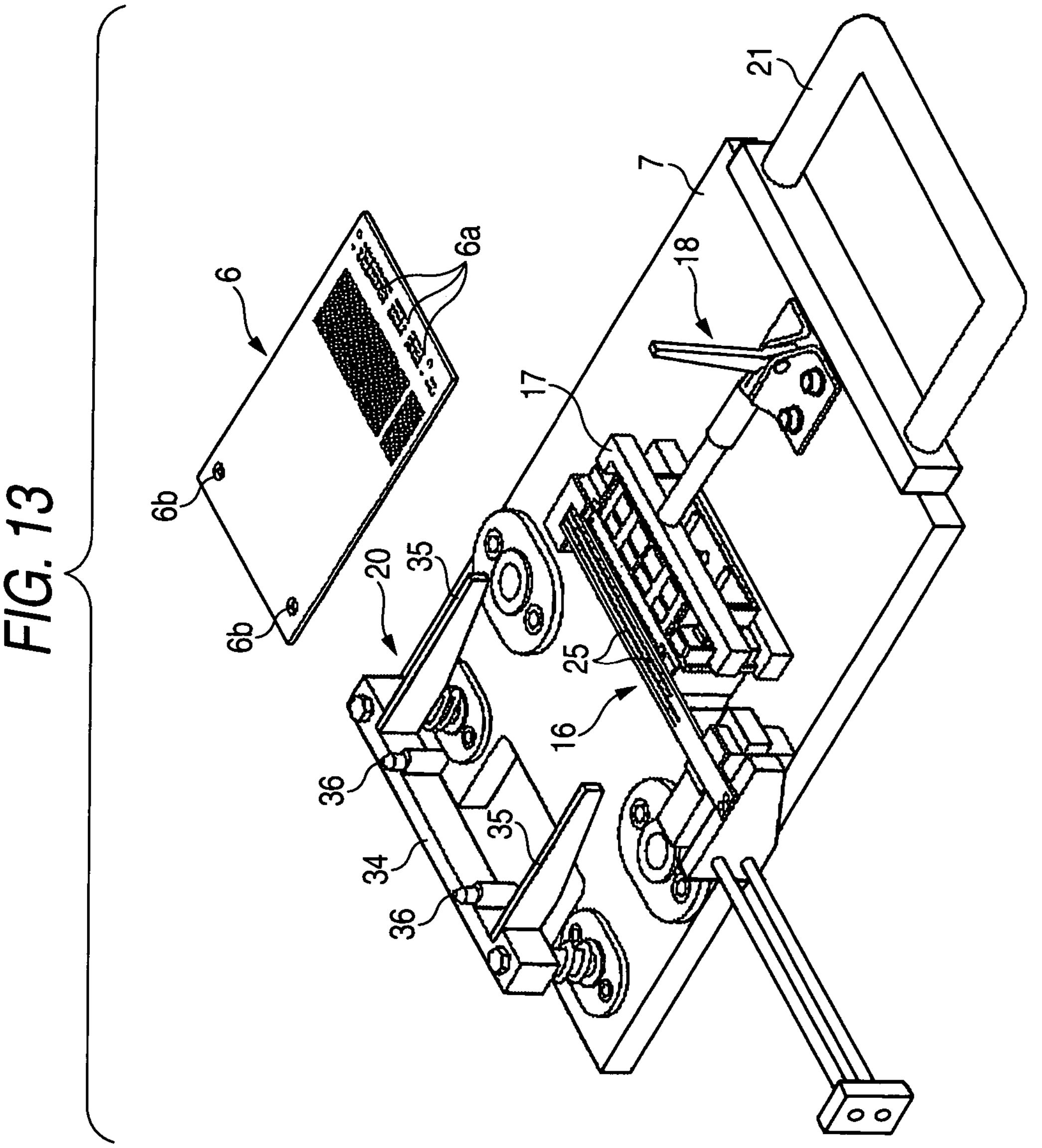
FIG. 13 is a perspective view illustrating the connector positioned.

Next, when the second terminal restricting member 16 at the evacuating position as shown in FIG. 9 is slid to have a displacement toward the center of the support table 7 as shown in FIG. 13, then the guide section 25 of the second terminal restricting member 16 is introduced along the lateral direction Y of the connector housing 2 to a part in which the terminals 3 are provided, thus restricting the lateral displacement of each terminal 3 by the above-mentioned guide section 25 (see FIG. 10). In this way, the connector housing 2 is held on the support table 7 while the guide section 22 of the first terminal restricting member 15 and the guide section 25 of the second terminal restricting member 16 accurately position the terminals 3 in the connector housing 2 that are projected in the upward direction, respectively.

Figure 14:
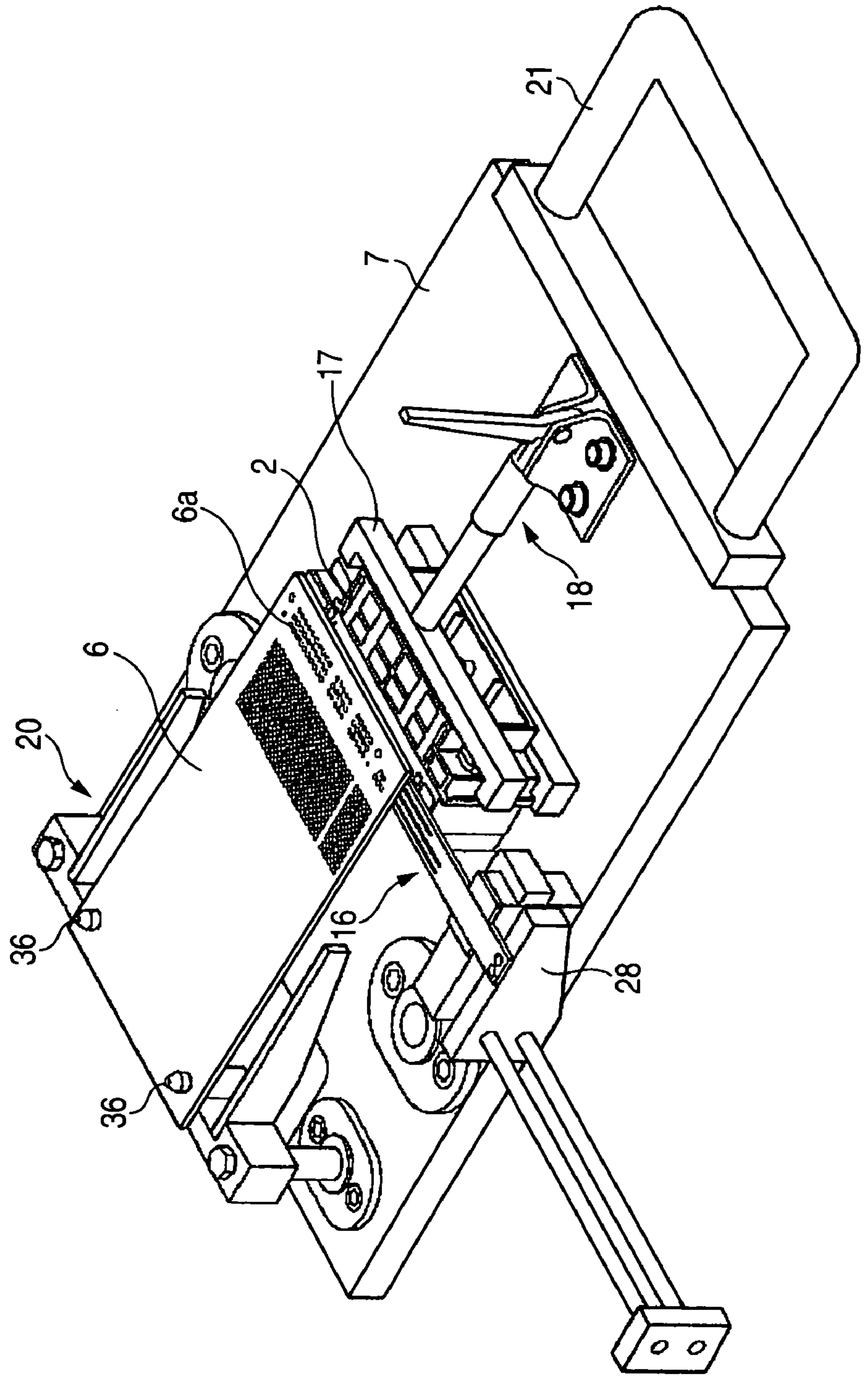
FIG. 14 is a perspective view illustrating the substrate temporarily locked.

Then, the substrate 6 is positioned such that the positioning pin 36 provided in the above-mentioned substrate-holding section 20 is inserted into the positioning hole 6*b* of the substrate 6 and a part in which the above-mentioned insertion hole 6*a* is provided is provided on the holding section of the above-mentioned connector housing 2 as shown in FIG. 14. As a result, the substrate 6 is held by the substrate-holding section 20 while the tip end section of the terminal 3 projected in an upward direction in the connector housing 2 is positioned to be temporarily inserted into the above-mentioned insertion hole 6*a*.

Figure 15:
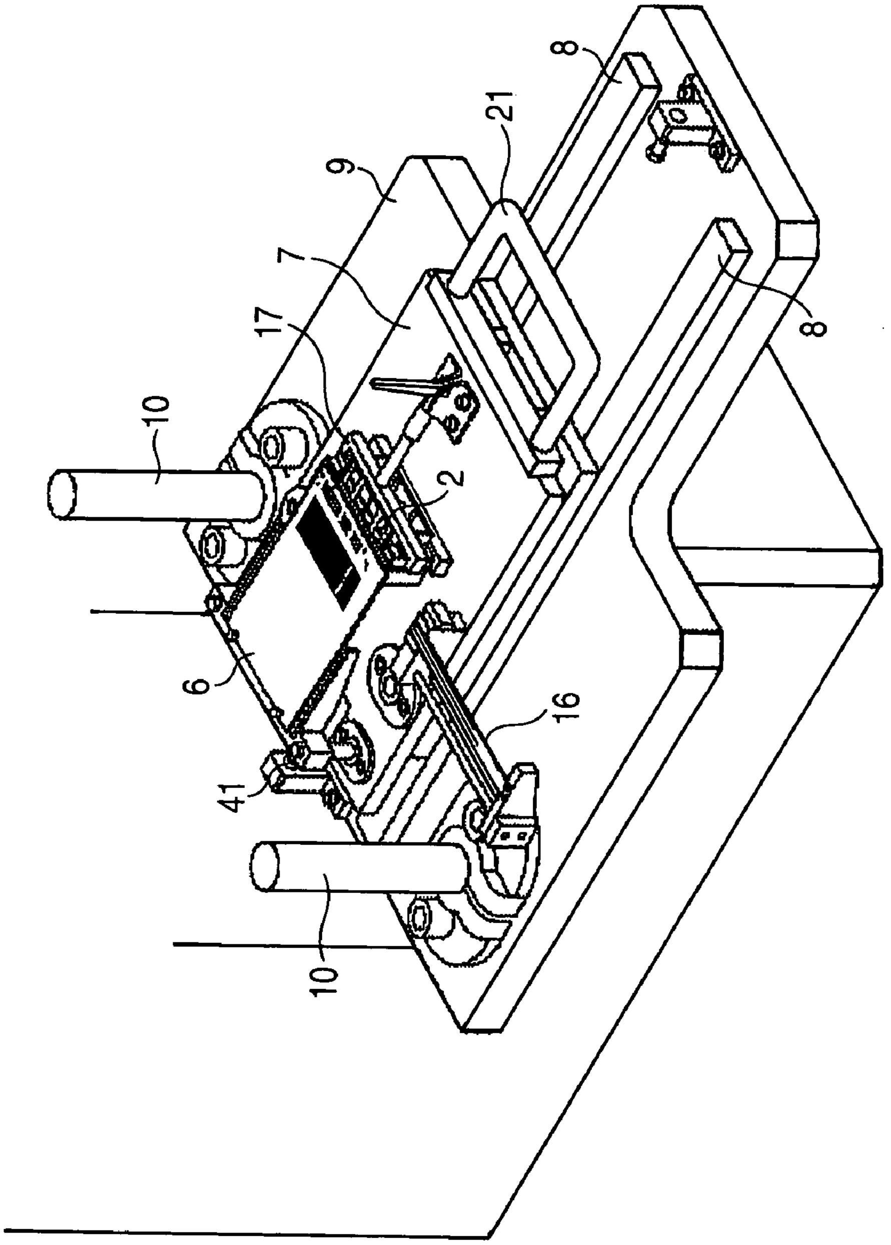
FIG. 15 is a perspective view illustrating the support table roved to the press-fitting position.

As described above, the slide block 28 is slid along the above-mentioned slide bar 27 to have a displacement toward the exterior side of the support table 7 while the connector 1 and the substrate 6 are being held on the support table 6, thereby canceling the restriction of the terminal 3 by the above-mentioned second terminal restricting member 16. The grip 21 provided at the above-mentioned support table 7 is held to slide the support table 7 along the guide rail 8 to have a displacement toward the depth side of the base plate 9, thereby moving the above-mentioned support table 7 to the press-fitting position provided at the depth side of the base plate 9, as shown in FIG. 15. The above-mentioned support table 7 is slid to have a displacement until the support table 7 abuts against the stopper 41 provided at the inner end of the above-mentioned base plate 9 (see FIG. 5), thereby setting the support table 7 at the above-mentioned press-fitting position.

Figure 16:
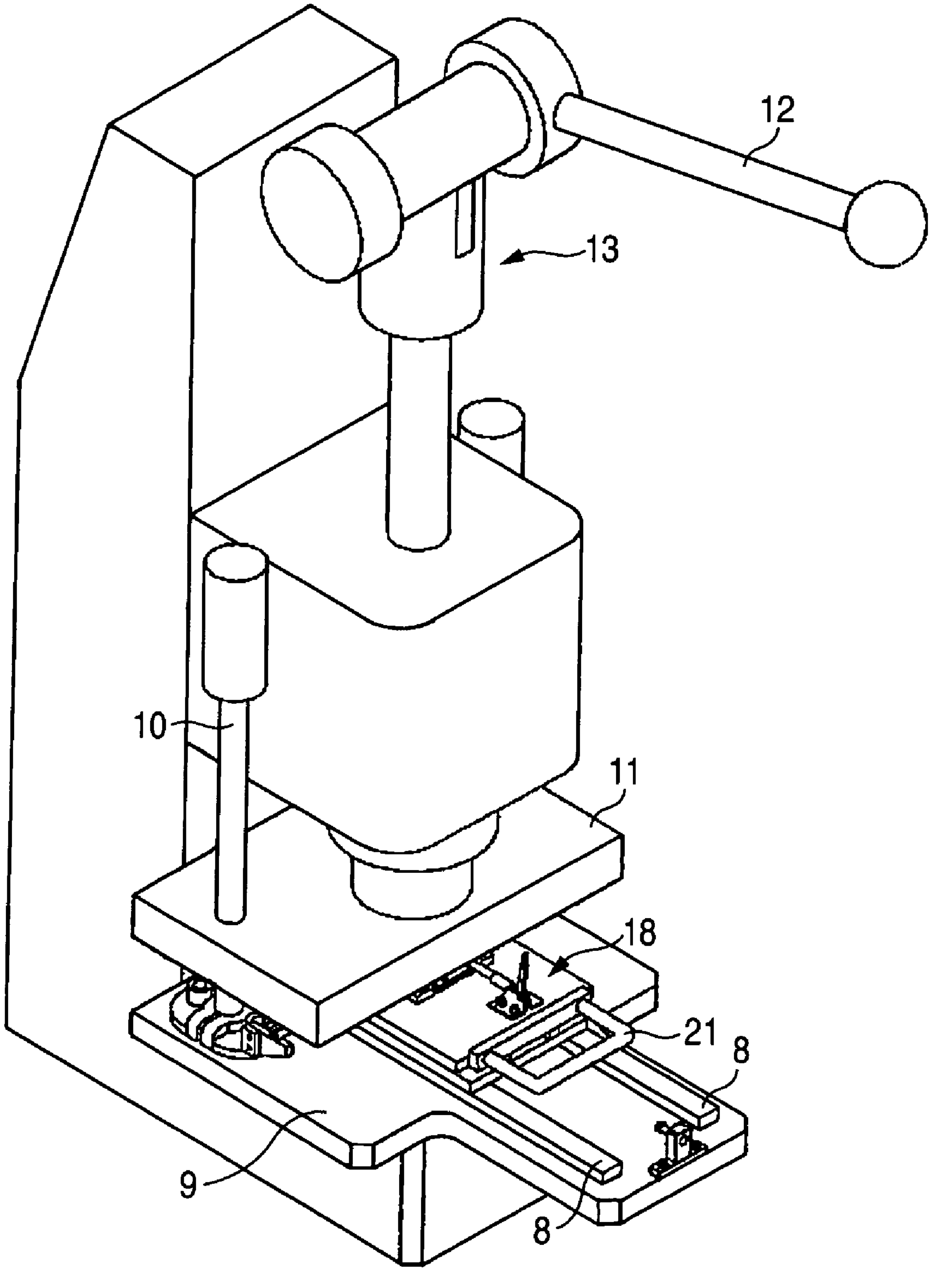
FIG. 16 is a perspective view illustrating the pressing plate pushed down to a position at which the terminal is press-fitted.

Then, the operation handle 12 of the above-mentioned elevation driving mechanism 13 is operated to push down the pressing plate 11 as shown in FIG. 16, thereby allowing this pressing plate 11 to be pressure contacted with the upper face of the above-mentioned substrate 6 to bias the substrate 6 in the lower direction. As a result, the press-fitting section 3*b* provided at the tip end section of the terminal 3 is press-fitted into the insertion hole 6*a* of the substrate 6. In accordance with this press-fitting operation, the above-mentioned substrate 6 is connected with the connector 1 and the above-mentioned elevation frame 34, the supporting column 33, and the lock plate 38 are lowered to cause the magnet plate 39 10 to be adsorbed on the holding plate 40. As a result the substrate 6 on the elevation frame 34 is held to be linked to the connector 1 (see FIG. 12B).

Figure 17:
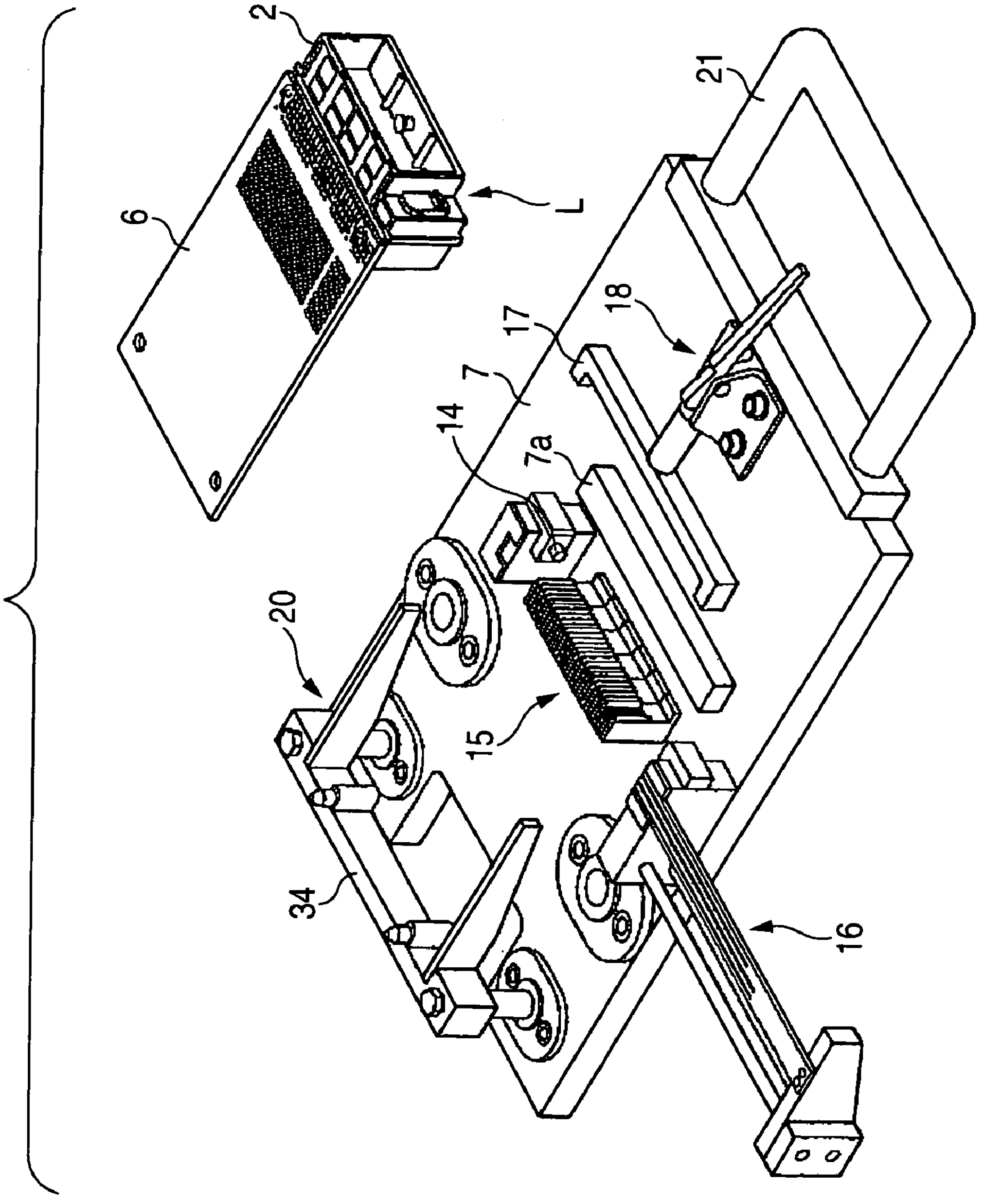
FIG. 17 is a perspective view illustrating the substrate and the connector being removed from the press-fitting device.

When the above-mentioned press-fitting operation is completed, the biasing force or the like of the return spring provided in the elevation driving mechanism 13 is used to raise the pressing plate 11 in the upward direction to the stand by position and the above-mentioned support table 7 is slid so as to be pulled to the front. Then, the holding status of the connector housing 2 by the above-mentioned connector-holding mechanism 18 is canceled as shown in FIG. 17 and the integrally-connected connector 1 and substrate 6 are removed from the support table 7. Thereafter, the arm 35 is raised in the upward direction or a guide section (not shown) is made to abut against the above-mentioned arm 35 to raise the elevation frame 34, the supporting column 33, and the lock plate 38, thereby canceling the state in which the elevation frame 34 is held by the above-mentioned magnet plate 39. As a result, the above-mentioned elevation frame 35 is returned to the substrate set position in the upward direction by the biasing force by the compression coil spring 37.

As described above, the terminal press-fitting device by which the tip end section of the terminal 3 provided in a projected manner in the connector housing 2 is press-fitted into the insertion hole 6*a* formed in the substrate 6 includes: the first terminal restricting member 15 including the guide section 22 that is introduced along the lateral direction Y of the connector housing 2 between the terminals 3 to restrict the vertical displacement of each terminal 3; and the second terminal restricting member 16 including the guide section 25 that is introduced along the vertical direction X of the connector housing 2 between the terminals 3 to restrict the lateral displacement of each terminal 3 at an upper part of the first terminal restricting member 15. The tip end section of the guide section 22 of the first terminal restricting member 15 positioned at the staggered-arrangement section 5 of the above-mentioned terminals 3A and 3B has the guide groove 23 to which the terminal 3B positioned at the depth side of the connector housing 2 is introduced. As a result, even when the guide member cannot be introduced in a straight manner along the terminals 3A and 3B provided in the above-mentioned staggered arrangement section 5, the tip end section can be press-fitted into the insertion hole 6*a* of the substrate 6 in an appropriate manner while the terminals 3A and 3B positioned at the above-mentioned staggered arrangement section 5 are accurately positioned.

Specifically, the tip end section of the guide section 22 of the first terminal restricting member 15 has the guide groove 23 having a predetermined width. As a result, in accordance with the introduction of the above-mentioned guide section 22 between the terminals 3A arranged at the exterior side of the connector housing 2 as shown in FIG. 8, the terminals 3B arranged at the rear side of the above-mentioned terminal 3A can be introduced to the above-mentioned guide groove 23. In this way, when the above-mentioned guide section 22 is introduced to the terminals 3A at the exterior side and the terminals 3B at the interior side are introduced to the above-mentioned guide groove 23, the bending of the terminals 3A and 3B can be corrected and the displacement of the terminals 3A and 3B in the vertical direction X can be effectively restricted by the base end section and the tip end section of the guide section 22, respectively.

In this way, the guide section 22 of the first terminal restricting member 15 is introduced along the lateral direction Y of the connector housing 2 to the region in which the terminals 3 are provided to restrict the vertical displacement of the respective terminals 3 and the guide section 25 of the second terminal restricting member 16 is introduced along the vertical direction X of the connector housing 2 to the region in which the terminals 3 are provided to restrict the vertical displacement of the respective terminals 3. As a result, each terminal 3 can be accurately positioned while preventing an adverse effect in which the terminal 3 is inclined or bent, for example. This allows, even in the case of a press fit connector requiring a large press-fitting force, the above-mentioned insertion hole 6*a* of the substrate 6 to be inserted with the tip end section of the terminal 3 easily and securely to properly connect the terminal, of the connector 1 to the substrate 6 without causing deformation of the above-mentioned terminal 3 such as bending.

In the above-mentioned embodiment, the lower end face of the expanded section 3*b* provided in each terminal 3 is provided to be opposed to the upper end face of the guide section 22 composing the above-mentioned first terminal restricting member 15 so that, when the terminal 3 is press-fitted, the lower face of the above-mentioned expanded section 3*b* abuts against the upper end face of the above-mentioned guide section 22 to restrict the displacement of each terminal 3 in the lower direction. However, the above-mentioned embodiment may be changed such that the above-mentioned first terminal restricting member 15 has a stepped section that is introduced to the lower part of the base end section 3*d* of the terminal 3 provided in a projected manner in the connector housing 2 so that this stepped section restricts the displacement of the above-mentioned terminal 3 in the lower direction.

In the structure as described above in which the stepped section provided in the first terminal restricting member 15 is used to restrict the displacement of the terminal 3 in the lower direction, there is a tendency where, when the tip end section of the terminal 3 is press-fitted into the insertion hole 6*a* of the substrate 6, the terminal 3 suffers buckling deformation due to the pressing load on the erecting section of the terminal 3. To prevent this, it is preferable that the lower end face of the expanded section 3*b* provided in the terminal 3 is provided to be opposed to the upper end face of the guide section 22 composing the first terminal restricting member 15 as shown in FIG. 8 so that the lower face of the above-mentioned expanded section 3*b* is made to abut against the upper end face of the guide section 22 to restrict the displacement of each, terminal 3 in the lower direction, thereby preventing the load that causes the buckling deformation of the terminal 3 from being applied to the above-mentioned erecting section.

The above-mentioned embodiment described the connector 1 having the staggered arrangement section 5 in which two columns of terminals 3A and 3B are arranged in the lateral direction Y of the connector housing 2. However, the present invention also can be applied to a connector in which the groove depth of the guide groove 23 formed in the guide section 22 of the first terminal restricting member 16 (lateral length of the connector housing 2) is set to have a value corresponding to the interval between the terminals 3 provided at two or more columns so that the lateral direction Y of the connector housing 2 has a staggered arrangement of three or more columns of terminals.

The terminal press-fitting device according to the present invention is also not limited to the connector 1 having the "L"-shaped terminal 3 that is formed by the base end section 3*d* that is provided in a projected manner and that is provided from the front face of the connector housing 2 in the forward direction; and the erecting section extending from the front end in the upward direction. The terminal press-fitting device according to the present invention also can be applied to a connector having a terminal that is provided in a projected and straight manner and, that is provided from the connector housing 2 in the upward direction. The terminal press-fitting device according to the present invention also can be applied to a connector in which all regions of the above-mentioned connector housing 2 have the staggered arrangement section 5 of the terminals.

The above-mentioned embodiment in which the guide section 22 of the first terminal restricting member 15 is constructed in the upward direction with the guide section 25 of the second terminal restricting member 16 also may be changed such that the guide section 25 of the second terminal restricting member 16 is provided in the upward direction with the guide section 22 of the first terminal restricting member 15.

EFFECTS OF THE INVENTION

As described above, the present invention is: A terminal press-fitting device in which a plurality of terminals are provided in a connector housing in a projected manner, and terminals of a connector having a staggered arrangement section of the terminals for which an arrangement position of the terminals in a lateral direction of the connector housing is set in a staggered manner are press-fitted into an insertion hole formed on the substrate, comprising: a first terminal restricting member on which a guide section for restricting the vertical displacement thereof by being introduced between the terminals along the lateral direction of the connector housing is provided; and a second terminal restricting member on which a guide section for restricting the lateral displacement thereof by being introduced between the terminals along the vertical direction of the connector housing in an upper or lower part of the first terminal restricting member is provided; wherein guide grooves to which terminals arranged on the interior side of the connector housing are introduced is provided at a tip end portion of the guide portion of the first terminal restricting member positioned at the staggered arrangement section of the terminals. As a result, an advantage is provided in which, the tip end section of the terminal can be appropriately press-fitted in the insertion hole of the above-mentioned substrate while each terminal positioned in the above-mentioned staggered arrangement section being accurately positioned and without causing an adverse effect in which the direction along which the terminal is projected is inclined, for example.

What is claimed is:

1. A terminal press-fitting device in combination with a connector that includes a connector housing having a plurality of terminals and a substrate that includes a plurality of insertion holes, where the terminal press-fitting device press-fits each terminal of the connector into a respective insertion hole of the substrate, in a vertical direction of the terminal and connector housing, and where the plurality of terminals includes a staggered arrangement section of terminals in which an arrangement of the terminals in a lateral direction of the connector housing is set in a staggered manner, the terminal press-fitting device comprising:

a first terminal restricting member having a guide section that restricts vertical displacement of the terminals, the first terminal restricting member being introduced between the terminals along the lateral direction of the connector housing; and a second terminal restricting member, separate from the first terminal restricting member, and having a guide section that restricts lateral displacement of the terminals, the second terminal restricting member being introduced between the terminals along the vertical direction of the connector housing in an upper or lower part of the first terminal restricting member, wherein a tip end portion of a guide portion of the first terminal restricting member includes a guide groove that receives a terminal arranged on an interior side of the connector housing in the staggered arrangement section of the terminals.

2. The terminal press-fitting device according to claim 1, wherein each terminal further includes an expanded section having a lower end face opposed to an upper end face of the guide section of the first terminal restricting member, and wherein, as the terminal press-fitting device press-fits each terminal into a respective insertion hole of the substrate, the lower end face of the expanded section abuts against the upper end face of the guide section so as to restrict displacement of each of the terminals in the lower direction.

* * * * *